Sept. 5, 1939.  F. HOEPPNER  2,171,832
BRAKE PEDAL JACK
Filed Jan. 17, 1939  2 Sheets-Sheet 1
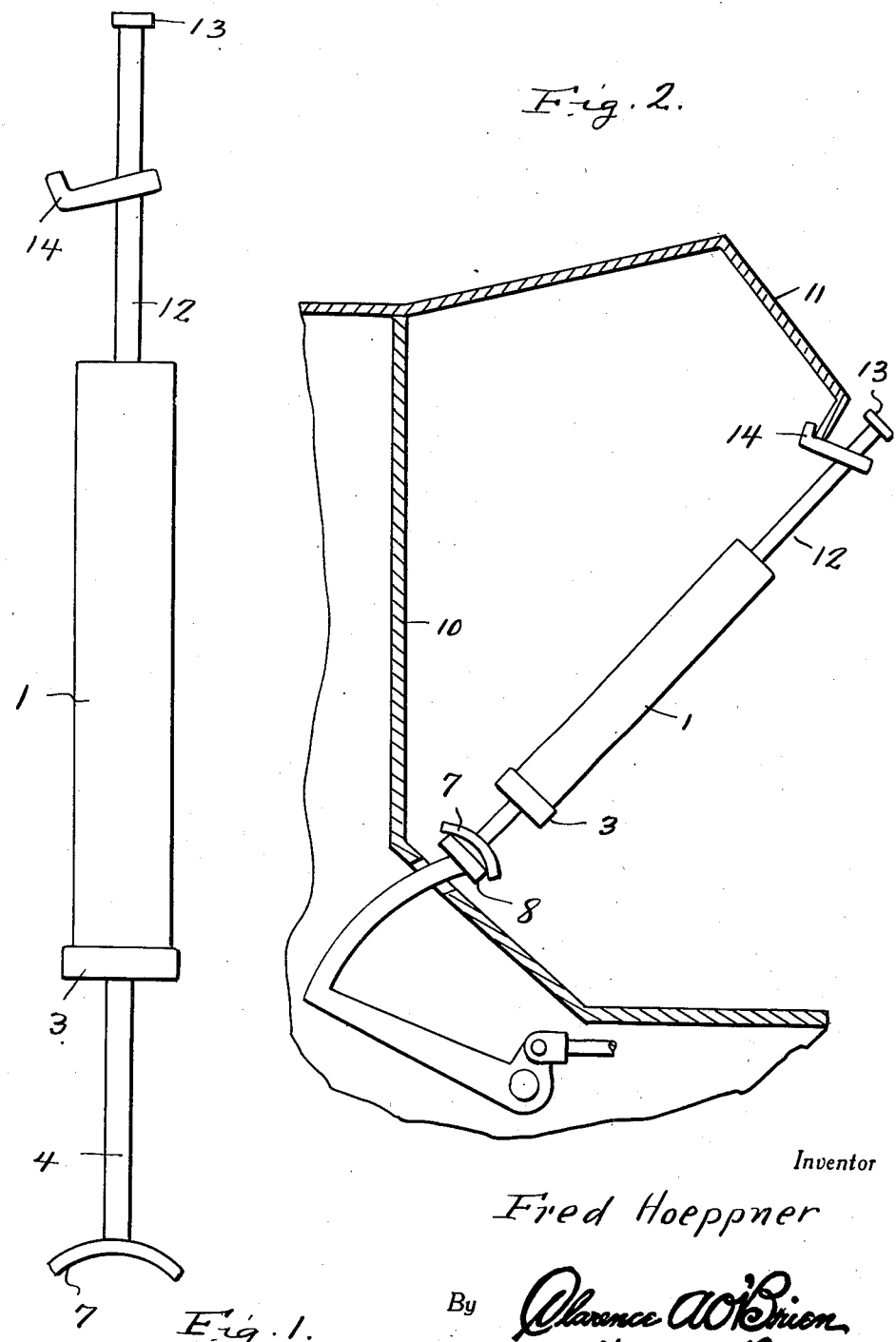
Inventor
Fred Hoeppner
By Clarence A. O'Brien
and Hyman Berman
Attorneys Sept. 5, 1939.  F. HOEPPNER  2,171,832
BRAKE PEDAL JACK
Filed Jan. 17, 1939   2 Sheets-Sheet 2
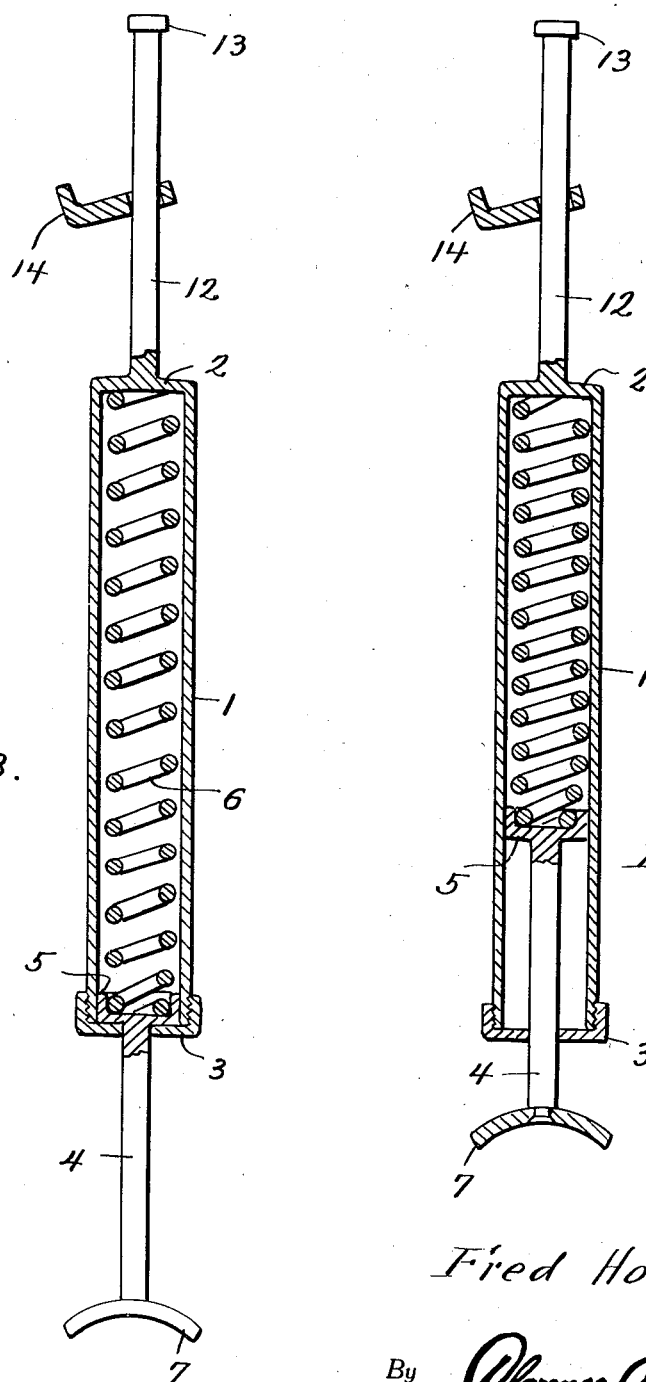
Inventor
Fred Hoeppner
By Clarence A. O'Brien
and Hyman Berman
Attorneys Patented Sept. 5, 1939

2,171,832

UNITED STATES PATENT OFFICE 2,171,832

BRAKE PEDAL JACK

Fred Hoeppner, Milwaukee, Wis.

Application January 17, 1939, Serial No. 251,440

1 Claim. (Cl. 254—1)

The present invention relates to new and useful improvements in brake pedal jacks for automobiles, particularly those which are equipped with hydraulic brakes, and has for its primary object to provide, in a manner as hereinafter set forth, a device of this character which is adapted to automatically depress the brake pedal for expelling the fluid from the system when the usual relief valves of the brakes are opened, thus permitting this draining operation to be expeditiously performed by a single man as distinguished from the present method which requires two men.

Another very important object of the invention is to provide a brake pedal jack of the aforementioned character which may be conveniently adjusted to meet different conditions that may be encountered in different automobiles.

Other objects of the invention are to provide a brake pedal jack of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a brake pedal jack constructed in accordance with the present invention.

Figure 2 is a view in side elevation, showing the device in use, a portion of an automobile body being shown in vertical section.

Figure 3 is a view principally in vertical section through the device, showing the pedal engaging foot in extended position.

Figure 4 is a view substantially similar to Fig. 3 but showing the pedal engaging foot in retracted position.

Referring now to the drawings in detail, it will be seen that the embodiment of the invention which has been illustrated comprises an elongated cylinder 1 of suitable metal, which cylinder may be of any desired length and diameter. The upper end of the cylinder 1 is closed, as at 2. Threaded on the lower end of the cylinder 1 is a removable closure cap 3.

Extending slidably through an opening which is provided therefor in the cap 3 is a metallic rod 4. On the upper end of the rod 4 is a substantially cup-shaped piston 5 which is slidable in the cylinder 1. A coil spring 6 in the cylinder 1 yieldingly urges the piston 5 and the rod 4 downwardly, the lower end portion of said coil spring being engaged in said piston. Of course, the upper end of the coil spring 6 is engaged with the upper end 2 of the cylinder 1. Mounted on the lower end of the rod 4 is an arcuate foot 7 which is engageable with the brake pedal to be depressed, as at 8. This is shown to advantage in Fig. 2 of the drawings. The reference numeral 9 designates a portion of an automobile body. The instrument board of the vehicle is indicated at 11.

Rising from the upper end 2 of the cylinder 1 is a longitudinally extending stationary rod 12. A head 13 is provided on the upper end of the stationary rod 12. Loosely mounted on the stationary rod 12 is a slidably adjustable catch or hook 14.

It is thought that the manner in which the device functions will be readily apparent from a consideration of the foregoing. Briefly, the foot 7 is engaged with the brake pedal 8 and the spring 6 is compressed or placed under tension by pushing downwardly on the cylinder 1. The position of the parts when this is done is shown to advantage in Fig. 4 of the drawings. The hook 14 is then adjusted on the stationary rod 12 and engaged beneath the instrument board 11 of the vehicle. Of course, the hook 14 may be engaged with any other suitable or convenient part of the vehicle, such as the steering wheel. With the device thus mounted in position with the coil spring 6 under tension, the brake pedal 8 is being urged downwardly. Then, when the usual relief valves are opened at the brakes of the vehicle the spring 6 depresses the pedal 8 and holds it in this position thus ejecting the fluid from the brake system. The hook 14 automatically secures itself in adjusted position on the rod 12 by frictionally gripping said rod when said hook is cocked.

It is believed that the many advantages of a brake pedal jack constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A brake pedal jack of the character described comprising, in combination, an elongated cylinder closed at one end, a removable cap on the other end of said cylinder, a rod extending slidably through said cap into the cylinder, a substantially cup-shaped piston on one end of said rod slidable in the cylinder, a foot on the other end of the rod engageable with a brake pedal, a stationary rod extending longitudinally from the closed end of the cylinder, an adjustable hook slidably mounted on said stationary rod and engageable with a support for detachably connecting the cylinder thereto, said hook being adapted to bind on the stationary rod when cocked for securing said hook in adjusted position, a retaining head for the hook on the free end of the stationary rod, and a coil spring mounted in the cylinder and having one end engaged with the closed end thereof and its other end engaged in the piston, said coil spring constituting means for actuating the first named rod for depressing the brake pedal.

FRED HOEPPNER.